(12) United States Patent
Hoffmann

(10) Patent No.: US 11,070,487 B2
(45) Date of Patent: Jul. 20, 2021

(54) CONTROLLING OF COMMUNICATION NETWORK COMPRISING VIRTUALIZED NETWORK FUNCTIONS

(71) Applicant: NOKIA SOLUTIONS AND NETWORKS GMBH & CO. KG, Munich (DE)

(72) Inventor: Klaus Hoffmann, Munich (DE)

(73) Assignee: NOKIA SOLUTIONS AND NETWORKS GMBH & CO. KG, Munich (DE)

( * ) Notice: Subject to any disclaimer, the term of this patent is extended or adjusted under 35 U.S.C. 154(b) by 810 days.

(21) Appl. No.: 15/310,849

(22) PCT Filed: May 12, 2014

(86) PCT No.: PCT/EP2014/059611
§ 371 (c)(1),
(2) Date: Nov. 14, 2016

(87) PCT Pub. No.: WO2015/172803
PCT Pub. Date: Nov. 19, 2015

(65) Prior Publication Data
US 2017/0093749 A1  Mar. 30, 2017

(51) Int. Cl.
*H04L 12/911* (2013.01)
*G06F 16/951* (2019.01)
(Continued)

(52) U.S. Cl.
CPC .......... *H04L 47/783* (2013.01); *G06F 9/5077* (2013.01); *G06F 16/951* (2019.01);
(Continued)

(58) Field of Classification Search
CPC ....... H04L 47/783; H04L 41/12; H04L 41/20; H04L 61/1511; H04L 67/10; H04L 67/32;
(Continued)

(56) References Cited

U.S. PATENT DOCUMENTS 9,270,596 B2 * 2/2016 Parker ..................... H04L 47/10
9,342,338 B2 * 5/2016 Vecera ................ G06F 9/45558
(Continued)

FOREIGN PATENT DOCUMENTS

CN    103765386 A    4/2014
CN    104009871 A    8/2014
(Continued)

OTHER PUBLICATIONS

International Search Report & Written Opinion dated Jan. 23, 2015 corresponding to International Patent Application No. PCT/EP2014/059611.
(Continued)

*Primary Examiner* — Philip J Chea
*Assistant Examiner* — Robert B McAdams
(74) *Attorney, Agent, or Firm* — Squire Patton Boggs (US) LLP

(57) ABSTRACT

A method comprising determining that at least one virtualized communication function or application providing services related to a communication network is instantiated, preparing an indication related to the instantiation of the at least one virtualized communication function or application, and causing transmission of the prepared indication to at least one of a network element of the communication network, a network function of the communication network, a communication function, an application and a database to which network elements, network functions, communication functions or applications in the communication network have access.

12 Claims, 8 Drawing Sheets

(51) Int. Cl.
*H04L 29/08* (2006.01)
*G06F 9/50* (2006.01)
*H04L 12/24* (2006.01)
*H04L 29/12* (2006.01)
*H04W 4/60* (2018.01)

(52) U.S. Cl.
CPC .............. *H04L 41/12* (2013.01); *H04L 41/20* (2013.01); *H04L 61/1511* (2013.01); *H04L 67/10* (2013.01); *H04L 67/32* (2013.01); *H04L 61/6004* (2013.01); *H04W 4/60* (2018.02)

(58) Field of Classification Search
CPC . H04L 61/6004; G06F 16/951; G06F 9/5007; H04W 4/60
See application file for complete search history.

(56) References Cited

U.S. PATENT DOCUMENTS

| | | | | |
|---|---|---|---|---|
| 9,348,655 | B1* | 5/2016 | Tsirkin | G06F 9/5088 |
| 2012/0147824 | A1 | 6/2012 | Van der Merwe et al. | |
| 2012/0300615 | A1 | 11/2012 | Kempf et al. | |
| 2013/0058227 | A1* | 3/2013 | Lemieux | G06F 9/5077 370/252 |
| 2014/0019621 | A1* | 1/2014 | Khan | G06F 9/4856 709/226 |

FOREIGN PATENT DOCUMENTS

| | | |
|---|---|---|
| JP | 2012199730 A | 10/2012 |
| JP | 2013017007 A | 1/2013 |
| JP | 2014021979 A | 2/2014 |
| WO | 2013035051 A1 | 3/2013 |
| WO | WO 2015/090455 A1 | 6/2015 |
| WO | WO 2015/106822 A1 | 7/2015 |

OTHER PUBLICATIONS

3GPP TS 23.401 V123.0 (Dec. 2013), Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 12), Dec. 2013, 302 pages.

3GPP TS 29.061 V125.0 (Mar. 2014), Technical Specification, 3rd Generation Partnership Project; Technical Specification Group Core Network and Terminals; Interworking between the Public Land Mobile Network (PLMN) supporting packet based services and Packet Data Networks (PDN) (Release 12), Mar. 2014, 164 pages.

Jan. 26, 2018 Office Action issued in Japanese Patent Application No. 2017-512099.

Chinese Office Action application No. 2014800805598 dated Jan. 30, 2019.

Indian Office Action corresponding to in Appln. No. 201617040515, dated Jun. 17, 2020.

* cited by examiner

| Octets | Bits 8 | 7 | 6 | 5 | 4 | 3 | 2 | 1 |
|---|---|---|---|---|---|---|---|---|
| 1 | Type = 117 (decimal) ||||||||
| 2 to 3 | Length = n ||||||||
| 4 | Spare |||| Instance ||||
| 5 | MCC digit 2 |||| MCC digit 1 ||||
| 6 | MNC digit 3 |||| MCC digit 3 ||||
| 7 | MNC digit 2 |||| MNC digit 1 ||||
| 8 to 9 | MME Group ID ||||||||
| 10 | MME Code ||||||||
| 11 to (n+4) | M-TMSI ||||||||

Fig. 4

CONTROLLING OF COMMUNICATION NETWORK COMPRISING VIRTUALIZED NETWORK FUNCTIONS

BACKGROUND

Field

The present invention relates to apparatuses, methods, systems, computer programs, computer program products and computer-readable media usable for controlling a communication network comprising at least one virtualized network function.

Background Art

The following description of background art may include insights, discoveries, understandings or disclosures, or associations, together with disclosures not known to the relevant prior art, to at least some examples of embodiments of the present invention but provided by the invention. Some of such contributions of the invention may be specifically pointed out below, whereas other of such contributions of the invention will be apparent from the related context.

The following meanings for the abbreviations used in this specification apply:
3GPP 3$^{rd}$ Generation Partner Project
AP: access point
APN: access point name
ATCA: advanced telecommunications computing architecture
BGCF: breakout gateway control function
BNG: broadband network gateway
BRAS broadband access server
BS: base station
CAM cloud application manager (formerly known as CFW)
CFW cloud framework
CN: core network
CP control plane
CPU: central processing unit
DB: database
CSCF: call session control function
DNS: domain name server
DP data plane
DSL: digital subscriber line
DL: downlink
eNB: evolved node B
EPC: evolved packet core
ETSI European Telecommunications Standards Institute
GGSN: gateway GPRS support node
GO: global orchestrator
GPRS General Packet Radio Service
GTP-C GPRS tunnelling protocol-control plane
GUMMEI: globally unique MME identifier
GUTI: globally unique temporary identifier
HeNB: home eNB
HSS: home subscriber server
IBCF: interconnection border control function
ID: identification, identifier
IMS: IP multimedia system
IP Internet protocol
LTE: Long Term Evolution
LTE-A: LTE Advanced
M2M: machine to machine
MAC: medium access control
MCC: mobile country code
MGCF: media gateway control function
MME mobility management entity
MNC: mobile network code
M-TMSI: MME temporary mobile subscriber identity
NE: network element
NF: network function
NFV: network function virtualization
NUC: network utilisation controller
OAM operation administration maintenance
OFC: open flow controller
OTT: over the top
P-CSCF: proxy call session control function
PCRF: policy and charging rules function
PGW packet data network gateway
PGW-C PGW control plane
PGW-U PGW user plane
PIP/InP physical infrastructure provider/infrastructure provider
RAN: radio access network
SCTP: stream control transmission protocol
SDN software defined networks/networking
SGSN: serving GPRS support node
SGW signaling gateway
SGW-C SGW control plane
SGW-U SGW user plane
SIP: session initiation protocol
UE: user equipment
UL: uplink
UMTS: universal mobile telecommunication system
UP: user plane
VNO: virtual network operator Embodiments of the present invention are related to a communication network comprising at least one virtualized network function, virtualized communication function or communication application. A virtualized network function, communication function or communication application may be of any type, such as a virtual core network function, a virtual access network function, a virtual IMS element, a virtualized terminal function, an OTT function or element, a function or element capable to an M2M communication, or the like.

SUMMARY

According to an example of an embodiment, there is provided, for example, a method comprising determining that at least one virtualized communication function or application providing services related to a communication network is instantiated, preparing an indication related to the instantiation of the at least one virtualized communication function or application, and causing transmission of the prepared indication to at least one of a network element of the communication network, a network function of the communication network, a communication function, an application and a database to which network elements, network functions, communication functions or applications in the communication network have access.

Furthermore, according to an example of an embodiment, there is provided, for example, an apparatus comprising at least one processing circuitry, and at least one memory for storing instructions to be executed by the processing circuitry, wherein the at least one memory and the instructions are configured to, with the at least one processing circuitry, cause the apparatus at least: to determine that at least one virtualized communication function or application providing services related to a communication network is instantiated, to prepare an indication related to the instantiation of the at least one virtualized communication function or application, and to cause transmission of the prepared indication to at least one of a network element of the communication network, a network function of the communication network, a communication function, an application and a database to which network elements, network functions, communication functions or applications in the communication network have access.

According to further refinements, these examples may comprise one or more of the following features:

- at least one new virtualized communication function or application providing services related to a communication network may be set up, wherein the determination that at least one virtualized communication function or application providing services related to a communication network is instantiated may be made when the setup of the new virtualized communication function or application is completed;
- the indication may comprise at least one of information indicating a type of the at least one virtualized communication function or application, information indicating a type of services provided by the at least one virtualized communication function or application, address information associated to the at least one virtualized communication function or application, and identification information related to a virtual network operator operating the at least one virtualized communication function or application;
- transmission of the prepared indication may be caused to a domain name server element or function;
- the processing may be executed by one of a communication network control element or communication network control function acting as a global orchestrator for implementing virtualized communication functions or applications, an operation and maintenance element of the communication network, and a communication network control element or communication network control function of a communication network in which virtualized communication functions or applications are implemented, wherein the at least one virtualized communication function or application being instantiated is related to a communication network control function of the communication network;
- the prepared indication may be caused to be sent to at least one of a communication element comprising a terminal device or user equipment capable of communicating in the communication network, a network element or network function of a radio access network part of the communication network, a network element or network function of a fixed access network part of the communication network, a network element or network function of a core network part of the communication network, a network element or network function of an IP multimedia system part of the communication network, a communication function or application communicating in the communication network, and a database to which network elements or network functions of the communication network, communication functions or applications have access, wherein the database may be comprised in at least one of a centralized database of the communication network and a local database comprised in one or more of the network elements or network functions of the communication network.

According to another example of an embodiment, there is provided, for example, a method comprising checking, when a communication is to be conducted with a network element or network function, a communication function or application in a communication network, whether at least one new virtualized communication function or application providing suitable services related to the communication network is indicated to be instantiated, and selecting, on the basis of the result of the check, the network element or network function, communication function or application in the communication network with which a communication is to be conducted.

Furthermore, according to another example of an embodiment, there is provided, for example, an apparatus comprising at least one processing circuitry, and at least one memory for storing instructions to be executed by the processing circuitry, wherein the at least one memory and the instructions are configured to, with the at least one processing circuitry, cause the apparatus at least: to check, when a communication is to be conducted with a network element or network function, a communication function or application in a communication network, whether at least one new virtualized communication function or application providing suitable services related to the communication network is indicated to be instantiated, and to select, on the basis of the result of the check, the network element or network function, communication function or application in the communication network with which a communication is to be conducted.

According to further refinements, these examples may comprise one or more of the following features:

- an initial attach request related to an establishment of a communication connection of a communication element to a communication network may be received and processed, wherein the initial attach request may trigger the checking for a new virtualized communication function or application;
- the checking for a new virtualized communication function or application may triggered on a time basis or in response to a predetermined event;
- an indication related to an instantiation of at least one virtualized communication function or application providing services related to a communication network may be obtained, and the obtained indication may be processed for determining or recognizing the virtualized communication function or application being instantiated;
- the indication may comprises at least one of information indicating a type of the at least one virtualized communication function or application, information indicating a type of services provided by the at least one virtualized communication function or application, address information associated to the at least one virtualized communication function or application, and identification information related to a virtual network operator operating the at least one virtualized communication function or application;
- the indication related to the instantiation of the at least one virtualized communication function or application may be obtained from one of a communication network control element or communication network control function acting as a global orchestrator for implementing virtualized communication functions or applications, an operation and maintenance element of the communication network, a domain name server of the communication network, and a communication network control element or communication network control function of the communication network in which virtualized communication functions or applications are implemented;
- when checking for a new virtualized communication function or application, a database to which network elements or network functions of the communication network, communication functions or applications have access may be queried, wherein the database may be comprised in at least one of a centralized database of the communication network and a local database comprised in one or more of the network elements or network functions of the communication network, wherein an indication related to an instantiation of at least one virtualized communication function or application is obtained from the database;

the processing may be executed by one of a communication element comprising a terminal device or user equipment capable of communicating in the communication network, a network element or network function of a radio access network part of the communication network, a network element or network function of a fixed access network part of the communication network, a network element or network function of a core network part of the communication network, a network element or network function of an IP multimedia system part of the communication network, and a communication function or application communicating in the communication network, wherein the at least one new virtualized communication function or application being instantiated may be related to a communication network control function of the communication network.

In addition, according to embodiments, there is provided, for example, a computer program product for a computer, comprising software code portions for performing the steps of the above defined methods, when said product is run on the computer. The computer program product may comprise a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some embodiments of the present invention are described below, by way of example only, with reference to the accompanying drawings, in which:

FIG. 4 shows a diagram illustrating a structure of identification data usable in some examples of embodiments;

DESCRIPTION OF EMBODIMENTS

In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) and fourth generation (4G) communication networks like the Universal Mobile Telecommunications System (UMTS), enhanced communication networks based e.g. on LTE or LTE-A, cellular 2nd generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments.

Generally, for properly establishing and handling a communication connection between terminal devices such as a user device or user equipment (UE) and another communication network element or user device, a database, a server, host etc., one or more network elements such as communication network control elements, for example access network elements like access points, base stations, eNBs etc. and core network elements or functions, for example control nodes, support nodes, service nodes, gateways etc. are involved, which may belong to different communication network systems.

Such communication networks comprise, for example, a large variety of proprietary hardware appliances. Launching a new network service often requires yet another appliance and finding the space and power to accommodate these boxes is becoming increasingly difficult. Moreover, hardware-based appliances rapidly reach end of life. Due to this, it has been considered to use, instead of hardware based network elements, virtually generated network functions, which is also referred to as network functions virtualization. By means of software based virtualization technology, it is possible to consolidate many network equipment types onto industry standard high volume servers, switches and storage, which could be located in data centres, network nodes and in the end user premises, for example.

Figure 1:
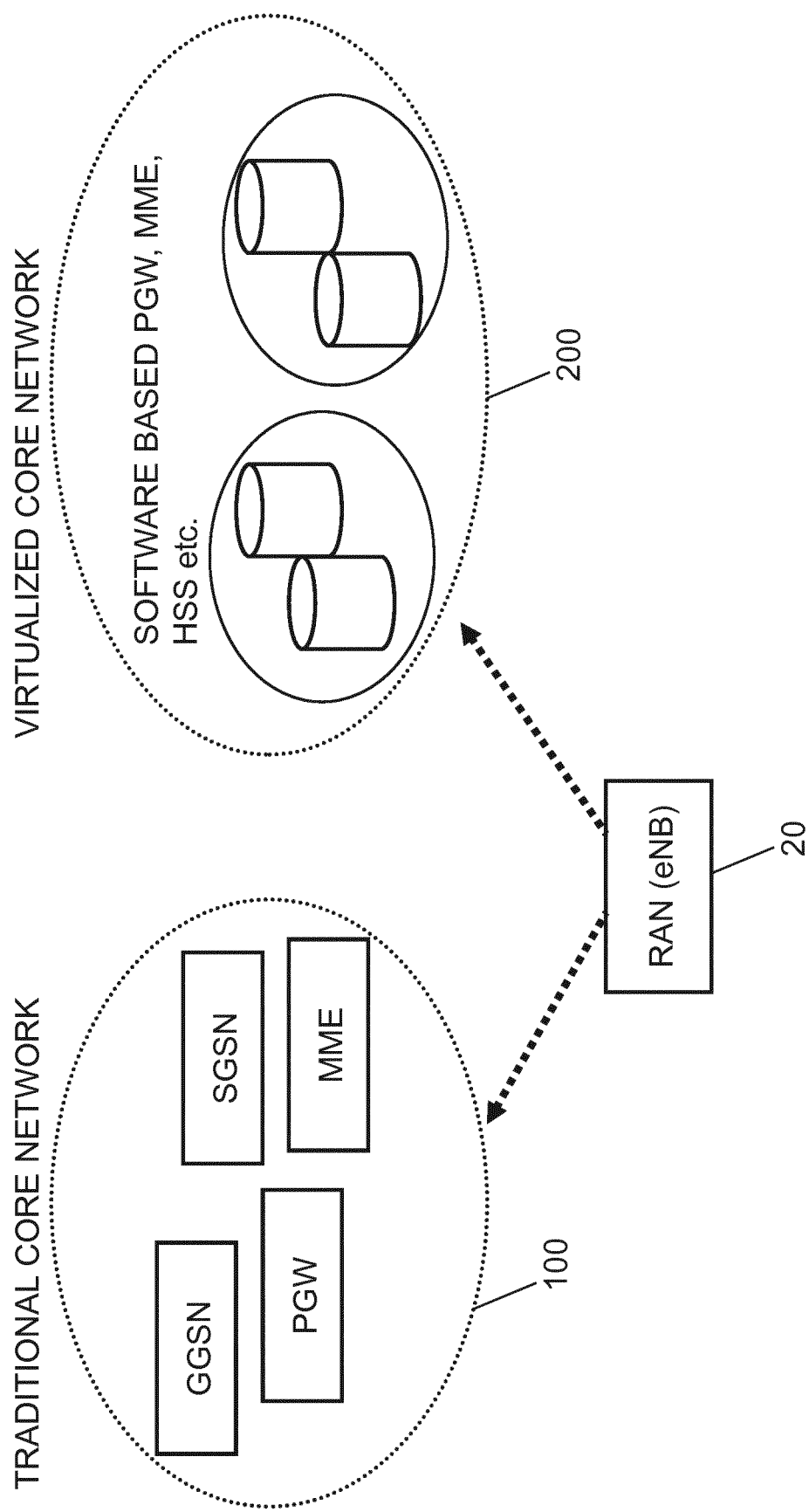
FIG. 1 shows a diagram illustrating a general configuration of communication networks where some examples of embodiments are implementable.

FIG. 1 shows an example of a general configuration of communication networks where some examples of embodiments are implementable. As shown in FIG. 1, network functions may be implemented as "traditional" network elements, i.e. as dedicated hardware entities forming e.g. a traditional core network 100 of a communication network system consisting of e.g. GGSN, SGSN, PGW, MME, SGW, SGW-U, SGW-C, PGW-U, PGW-C etc. (i.e. core network elements like EPC elements, IMS network elements, etc.). Alternatively or additionally to the traditional core network, corresponding network functions may also be implemented in the form of virtual network functions (corresponding to network elements), i.e. as software running on corresponding computing devices like servers or the like and forming a virtualized core network 200. Such a virtualized core network comprises, for example, software based PGW, MME, HSS, SGW, SGW-C, etc., which execute the same or at least similar functions like corresponding hardware based network elements. An access network subsystem 20, such as a RAN (comprising one or more BS or eNBs) or a fixed access network, may be controlled by and have access to the core networks 100 and 200, as shown in FIG. 1.

It is to be noted that in a communication system both approaches may be used simultaneously and in a mixed manner, i.e. a core network being employed for services comprises virtual and "real" network elements or functions interacting which each other. Furthermore, also other network functions besides those of a (core) network (like EPC or IMS), such as network functions of an access network element like an eNB or BS may be provided as virtualized network functions.

NFV involves the implementation of network functions in software that can run on server hardware, and that can be moved to, or instantiated/setup in, various locations in the network or cloud/datacenters as required, without the need for installation of new equipment. It is to be noted that NFV is able to support SDN by providing the infrastructure upon which the SDN software can be run. Furthermore, NFV aligns closely with the SDN objectives to use commodity servers and switches. The SDN-User part may be placed outside or inside the cloud.

Within SDN, it is possible to split control plane and user plane. Furthermore NFV may be implemented in such a manner that network functions are instantiated and located within a so-called cloud environment, i.e. a storage and processing area shared by plural users, for example. For supporting the NFV using a cloud, a so-called cloud application manager (CAM) or the like (Cloud Framework, CFW) may be used. By means of this, it is for example possible to dynamically placing elements/functions of a core network in a flexible manner (e.g. without or with decomposed SGW and/or PGW being split into SGW-C, PGW-C, SGW-U, PGW-U and OFC) into the cloud.

Dynamically placing the NF into the cloud allows also that all of the NFs or some parts or functions of the core network are dynamically withdrawn completely from the cloud (i.e. de-instantiated), while other parts (legacy or SDN based or virtualized network functions) remain in the network structure as deemed necessary.

It is to be noted that instantiated (or instantiation) means in the context of the following description, for example, that a virtual network function acting in a communication network in the virtualized network part (see e.g. FIG. 1) is set up, turned on, activated or made in some other manner available for other communication network elements or functions. On the other hand, de-instantiated (or de-instantiation) means, for example, that a virtual network function acting in a communication network in the virtualized network part (see e.g. FIG. 1) is turned off, deactivated or made in some other manner not available for other communication network elements or functions, i.e. the instantiation of the virtual network function in question is removed or cancelled, at least temporarily.

In the following, examples and examples of embodiments of the invention are related to a case where a virtualized network function, such as a virtualized core network function (such as MME, SGW, PGW, HSS etc.) or a virtualized access network function (such as an eNB), a virtualized IMS function (such as a P-CSCF, IBCF, BGCF, MGCF etc.) is instantiated. Furthermore, examples are described where a corresponding virtualized network function is de-instantiated, i.e. at least partly cancelled or deactivated from the point of view of other network elements. For example, examples of embodiments of the invention are related to a scenario where an UE attaches or registers to an eNB which in turn connects to a (newly) instantiated virtualized MME or the like (a further example concerns a case where this virtualized MME is de-instantiated at a later point of time).

It is to be noted that in the following the term "attach" or "register" is to be understood as representing different forms of connecting or establishing and maintaining a connection between elements, functions or applications conducting a communication with each other, such as a connection between a communication element like a UE and a network (i.e. one or more network elements or functions), an M2M (machine to machine) communication, a communication involving one or more OTT applications (such as video data providing OTT applications or services, communication related OTT application or services like Skype, etc.) and the like, such as "attach" in the sense of LTE systems, "register" in the sense of IMS systems, etc. Similarly, the term "detach" or "deregister" is to be understood as representing different forms of disconnecting or cancelling a connection between elements, functions or applications conducting a communication with each other (like a UE and a network (i.e. one or more network elements or functions), M2M communication, OTT involving communication etc.), such as "detach" in the sense of LTE systems, "deregister" in the sense of IMS systems, etc.

In the following, some examples of embodiments are described with reference to the drawings, wherein, as an example of a communication network, a cellular wireless communication network, such as an LTE or LTE-Advanced based system, is used. However, it is to be noted that the present invention is not limited to an application using such types of communication systems, but is also applicable in other types of communication systems, be it wireless systems, wired systems or systems using a combination thereof.

The following examples and embodiments are to be understood only as illustrative examples. Although the specification may refer to "an", "one", or "some" example(s) or embodiment(s) in several locations, this does not necessarily mean that each such reference is to the same example(s) or embodiment(s), or that the feature only applies to a single example version or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a communication system where examples of embodiments are applicable may comprise a commonly known architecture of one or more communication networks comprising a wired or wireless access network subsystem and a core network. Such an architecture may comprise one or more communication network control elements, access network elements, radio access network elements, access service network gateways or base transceiver stations, such as a base station (BS), an access point or an eNB, which control a respective coverage area or cell and with which one or more communication elements or terminal devices such as a UE or another device having a similar function, such as a modem chipset, a chip, a module etc., which can also be part of an element, function or application capable of conducting a communication, such as a UE, an OTT application, an element or function usable in a M2M communication architecture, or attached as a separate element to such an element, function or application capable of conducting a communication, or the like, are capable to communicate via one or more channels for transmitting several types of data. Furthermore, core network elements such as gateway network elements, policy and charging control network elements, mobility management entities, operation and maintenance elements, and the like may be comprised.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from an element, function or application capable of conducting a communication, like an UE etc., and a communication network besides those described in detail herein below.

The communication network is also able to communicate with other networks, such as a public switched telephone network or the Internet. The communication network may also be able to support the usage of cloud services. It should be appreciated that network elements of the access system, such as BSs and/or eNBs, of a core network, an IMS network etc., OTT applications etc, and/or respective functionalities may be implemented by using any node, host, server or access node etc. entity suitable for such a usage. As indicated above, network elements, such as access network elements or core network elements, or elements, functions or applications capable of conducting a communication (such as a terminal device, an OTT application, an M2M communication element etc.) may also be implemented by using a corresponding virtualized communication function or application.

Furthermore, the described network elements, such as terminal devices or user devices like UEs, communication network control elements of a cell, like a BS or an eNB, access network elements like APs and the like, core network elements etc. as well as corresponding functions as described herein, and other elements, functions or application capable of conducting a communication may be implemented by software, e.g. by a computer program product for a computer, and/or by hardware. For executing their respective functions, correspondingly used devices, nodes or network elements may comprise several means, modules, units, components, etc. (not shown) which are required for control, processing and/or communication/signaling functionality. Such means, modules, units and components may comprise, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means comprising e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a communication network control element or of another entity of the communication network, such as of one or more of RAN elements like a BS or eNB, may be performed in different entities or functions, such as in a node, host or server, in a flexible manner. In other words, a "division of labour" between involved network elements, functions or entities may vary case by case.

Figure 2:
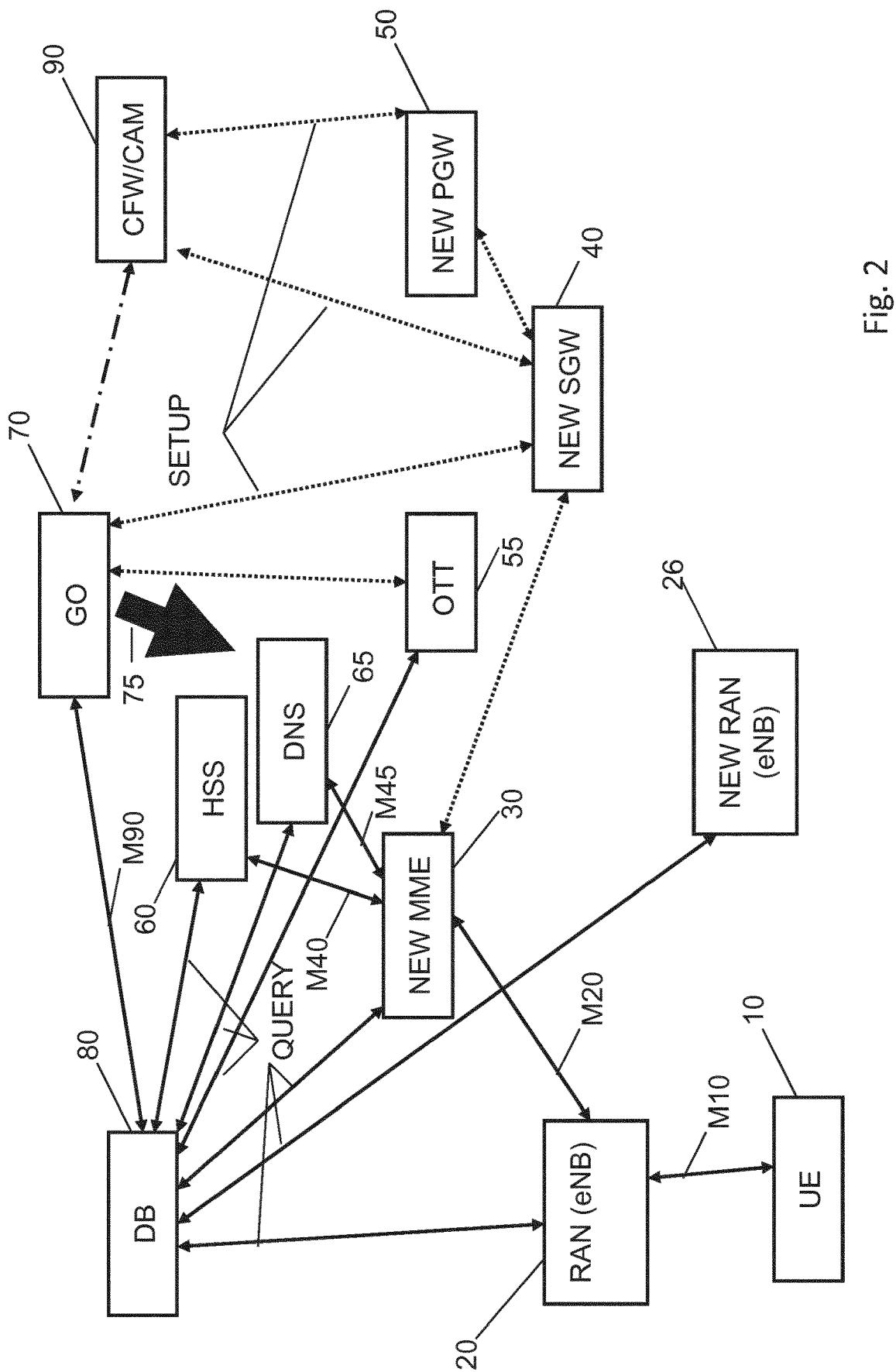
FIG. 2 shows a diagram illustrating a configuration of a communication network where some examples of embodiments are implementable.

FIG. 2 shows a diagram illustrating a configuration of a communication network where some examples of embodiments are implementable. It is to be noted that the configuration shown in FIG. 2 shows only those devices, network elements, functions, applications and/or parts which are useful for understanding principles underlying the example versions and embodiments. As also known by those skilled in the art, there may be several other network elements, functions, applications or devices involved in a communication network which are omitted here for the sake of simplicity.

In FIG. 2, a communication network configuration is illustrated which is for example based on the 3GPP specifications. It is to be noted that the general functions of the elements and functions described in connection with FIG. 2 as well as of reference points/interfaces between the elements are known to those skilled in the art so that a detailed description thereof is omitted here for the sake of simplicity. Furthermore, as also known to persons skilled in the art, the number of elements, functions and applications indicated in FIG. 2 may vary, i.e. there may be implemented or instantiated more corresponding elements, functions and application than those shown in FIG. 2.

As shown in FIG. 2, in the exemplary communication network system, a communication element such as a UE 10 is located in a communication area which is controlled by a respective communication network control element of an (radio) access network (RAN) comprising e.g. a base station or eNB 20 or 26. It is to be noted that the UE may change its location within the network from one communication area or cell to another.

In the illustrated example, the eNB 26 will be referred to as a new RAN element or eNB indicating here that this eNB 26 is newly instantiated or set up, for example, as a new virtualized network function. The eNB 20 will be referred to as a RAN element or eNB which is already in operation and communicates e.g. with the UE 10.

The respective RAN elements 20 and 26 are connected with core network elements of the EPC. The core network elements comprise, for example, MME 30, wherein MME 30 is assumed to be connected to the eNB 20. In the example indicated in FIG. 2, also a case will be considered where the MME 30 is instantiated as a new virtualized network element or function so that the MME 30 is also referred to as new MME 30 (it is obvious that there may be also MMEs being in operation, which are however not shown in detail in FIG. 2). The MMEs (e.g. MME 30) are connected to a HSS 60. Furthermore, the MMEs are also connected to an SGW which in turn is connected to a PGW. In the example illustrated in FIG. 2, an SGW 40 and a PGW 50 are illustrated which are related to the MME 30 (since examples described above are related to cases where the SGW and/or the PGW are instantiated as new virtualized network elements, the respective SGW 40 and PGW 50 are also indicated as new SGW and new PGW, respectively).

It is to be noted that the above described architecture indicated in FIG. 2 may be one being based on e.g. the 3GPP specification TS 23.401 (see e.g. version 12.3.0), to which reference is made herewith.

Moreover, it is to be noted that according to examples of embodiments of the invention, at least one of the network elements (i.e. core network elements or access network elements) is at least partly implemented by using a virtualized network function. In the following, cases will be described where at least one of the eNB 26, the MME 30, the SGW 40, the PGW 50 etc. is assumed as being such a virtualized network function. However, it is to be noted that also other network elements can be implemented as virtualized network functions in addition or alternatively to these elements.

Further elements shown in FIG. 2 are a DNS 65, a global orchestrator element or function (GO or NUC) 70, a database 80, and a CAM (CFW) 90.

The DNS 65 is used as a hierarchical distributed naming system for network elements, services, or any resource connected to the communication network. For example, it associates various information with names (domain names) assigned to each of the participating entities. For example, it translates identification names or the like to the numerical addresses needed for the purpose of locating services and devices.

The GO 70 is used to (directly or indirectly via the CAM 90) manage the virtualization of network functions, i.e. to instantiate (setup) (or de-instantiate (delete)) the respective NFs e.g. in a cloud environment and to generate and manage the links to other network elements and functions of the communication network. In FIG. 2, for the sake of convenience, this is indicated only for a part of the network functions, wherein dashed arrows indicate a setup process for instantiating a new virtualized communication function or application and for managing/instantiating links to corresponding communication partners in the network, while a chain dotted arrow indicates a link between the GO 70 and the CFW/CAM 90 for communicating instructions etc. For example, an SDN controller (not shown) may be implemented in the NFV. According to examples of embodiments, some sort of interface from the GO 70 to the cloud/datacenter is provided (even a dedicated ATCA platform), which may be designed to dynamically host software related to the virtualized network function, such as an MME software, an SGW software etc., which can be instantiated or withdrawn, or the like. It is to be noted that also the ATCA platform may be dynamically be loaded with the software needed for acting as e.g. the SGW-U (or otherwise enabled).

It is to be noted that according to examples of embodiments the GO 70 is able to instantiate any virtualized communication or network function or any application etc. via the CFW/CAM 90 (virtualized network functions are to be seen as an example of virtualized communication functions and concern, for example, virtualized functions related to core network or access network elements/functions). Furthermore, there are also links between the respective network elements or function (wherever they may be located, i.e. in a physical entity or in a cloud/datacenter) which are not indicated in FIG. 2, which might be implicitly/explicitly or indirectly/directly be triggered by the GO to be instantiated.

Furthermore, it is to be noted that according to examples of embodiments the type of network function, communication function or application etc. which may be instantiated by the GO 70 (via the CFW/CAM 90 or directly) is not limited to a specific type only. For example, besides a MME, network functions, communication functions or application which can be also instantiated are, for example, any SGW or PGW and/or decomposed SGW-C and SGW-U or PGW-C and PGW-U. Also IMS network functions or access network functions (e.g. an eNB function) can be instantiated.

Moreover, as indicated in FIG. 2, also applications or functions like OTT application 55 can be provided for communicating in the network. According to examples of embodiments, such communication functions or applications like OTT application 55 may be already present, or they are instantiated as a virtualized communication function or application, for example by the GO 70, in a manner similar to other virtualized network or communication functions or applications, as described above. That is, the OTT application 55 may be seen, in the context of the present examples, as another communication function or application which can be dynamically instantiated, and/or as a communication function or application which is part of a communication in the network and hence to be informed about an instantiation of a new virtualized network or communication function or application (e.g. a new CN NF, access network NF, OTT application etc.), if applicable (which will be described later).

The type of the network function, communication function or application to be instantiated by the GO 70 may be selected and instructed by an operator according to a current need or the like.

According to some examples of embodiments, the GO 70 is also able to provide information regarding the virtualized NF, communication function or application to other network elements and functions (which will be described later). This is indicated by arrow 75 which represents an indication for a corresponding communication or signaling to the network elements or functions being involved. For example, a signaling to the eNB 20, the MME 30, the DNS 65 etc. is concerned, in accordance with the following description, but also other network elements or functions, communication functions or applications may be recipients of a corresponding signaling caused by the GO 70. The goal of this signaling is, for example, to inform the respective network element or function, communication function or application about the instantiation (or de-instantiation, to be described later) of a virtualized network function, communication function or application and to advertise the existence (or deactivation) of the virtualized network function, communication function or application to potential signaling partners, i.e. network elements or functions, communication functions or applications which may communicate with this virtualized network function, communication function or applications during a communication or the like.

The database 80 is used, for example, by the GO 70 as storage for status information related to the virtualized network functions, communication functions or applications. For example, the database 80 is a scalable database with a hierarchical, distributed, centralized etc. configuration, wherein it is used to store and maintain information indicating e.g. an identification, a status etc. of all currently and formerly instantiated NFs, communication functions or applications, which information is updated e.g. by the GO 70 (see e.g. signaling at M90). The status information can be accessed by network elements, communication functions or applications by means of a query, for example (see also arrows from the RAN elements, core network elements, applications etc. in FIG. 2). It is to be noted that the database 80 may consist of one or more centralized databases within the communication network, or several local databases located at respective network elements and entities, or a combination thereof. In case of (plural) local databases included in respective network elements, the status information related to the virtualized network function, communication function or application can be written and updated by means of a suitable signaling, e.g. in association with the signaling indicated with arrow 75.

In the following, a case is described where a new instance, i.e. a new virtualized network function of a core network function like an MME or PGW is instantiated, wherein the new instance is advertised or indicated to several network elements, such as any potential signaling partners of the new instance or a database, so that the existing network elements (i.e. potential signaling partners) are able to know and to select the new instance. According to some examples of embodiments, a corresponding indication regarding the instantiation (or existence) of one or more new virtualized network functions is conducted by a suitable network entity, such as the GO 70.

Assuming the GO 70 determines that a new virtualized communication or network function, for example a new MME (e.g. MME 30) was instantiated, the GO 70 (directly or indirectly) informs the DB 80 or potential signalling partners of the new MME 30 about the existence thereof. One of the potential signalling partners is, as indicated in FIG. 2, the eNB 20.

The GO 70 determines the existence of a new virtualized network function for example by receiving and processing a corresponding indication from the new virtualized network function itself (as soon as it is operational), from an instance which instantiates the new virtualized network function (e.g. OAM system etc.), or, in case the instantiation of the new virtualized network function is initiated by the GO 70 itself, when the instantiation process is completed.

When the existence of the new virtualized network function is determined, a corresponding indication is prepared by the GO 70. Preferably, this indication is provided to recipients via a suitable interface (indicated by arrow 75 in FIG. 2), wherein the indication carries information related to the type of new virtualized network function (like MME, SGW-C, PGW, PGW-U), its associated address (e.g. IP, MAC, etc., depending on what is suitable for the function in question), and possibly the VNO ID of the virtual operator (e.g. in case of multi tenancy, where a plurality of operators is hosted on the same underlying network).

Now, it is assumed that the eNB 20 receives an initial attach request from UE 10 (see e.g. M10). In this case, the eNB 20 checks for available signalling partners on the core network side, i.e. for MMEs, for example, which are newly instantiated, i.e. for corresponding new virtualized network functions corresponding to a MME. According to examples of embodiments, eNB 20 consults the DB 80 or an internal database about dynamically newly instantiated MME instances. In case an internal DB is used, the information provided by the indication sent from the GO 70 are stored therein, for example. When the checking for new virtualized network functions is completed, the eNB 20 is able to select the best MME at hand, for example in accordance with a default selection process, wherein also the newly instantiated virtualized network functions corresponding to e.g. MME 30 can be considered.

Assuming now that the eNB 20 selects the new MME 30. Then, the attach request from the UE 10 arrives at the selected MME 30. The new MME 30 may send an attach accept message to the eNB 20 (M20). Furthermore, a location update procedure with the HSS 60 is conducted (see M40).

In accordance with procedure as described above for the GO 70, the GO 70 informs, according to some examples of embodiments, also the DNS 65 about the instantiation (i.e. existence) of the new virtualized network function (i.e. MME 30). Therefore, it is possible that the new MME 30 is in turn also informed about other newly instantiated virtualized network functions (e.g. SGW 40, SGW-C, SGW-U and/or PGW 50, PGW-C and PGW-U), which is indicate by M45. In other words, the now existing MME 30 is informed about the instantiation (or existence) of any newly instantiated virtual network function, such as a SGW/PGW, so that a corresponding SGW/PGW selection process conducted by the MME 30 can also consider this for selecting a new SGW/PGW.

As another example for a scenario of the instantiation of a new virtualized network element and the advertising thereof, for example, the instantiation of a new virtual eNB is to be noted. As potential signalling partners, this instantiation is also to be advertised to potential neighbouring eNBs, since, via a corresponding interface, such as an X2 interface, the eNB can recognize and select a preferred target eNB in case of the handover. That is, in the example of FIG. 2, when the eNB 26 is assumed to be the newly instantiated virtual eNB, a corresponding indication is to be directed also to eNB 20 (be it directly or by a query from eNB 20 to a database, such as DB 80).

Similar, as another example for a scenario of the instantiation of a new virtualized network element and the advertising thereof, an MME may need to select a preferred eNB in case of a handover. Therefore, the MME is to be informed about the eNBs being available.

As another example, a case is to be noted where an existing PCRF is informed about the existence of a newly instantiated PGW, or the other way around, when an existing PGW is informed about the existence of the newly instantiated PCRF.

The same principles apply also to other cases, for example, to a HeNB and HeNB gateways.

Furthermore, while in the above described examples a new virtualized network function is described to be instantiated, the same principles apply also for an instantiation of a communication function or application like an OTT application or service, such as OTT application 55. On the other hand, in case such an OTT application is already present (as dynamically virtualized communication function or application or provided by other means), the indication of a new virtualized network function or communication function may be provided to this existing OTT application as well, in order to enable a proper selection of communication partners.

As indicated above, according to examples of embodiments, a situation is described where initiating requests/messages like for instance the initial attach request (or a register message in IMS) trigger a check regarding a presence of newly instantiated virtual network functions, communication functions or applications, such as a query to detect new peer signalling instances. According to further examples, such a check may be executed by network elements or functions, communication functions or applications on a time basis, such as in predetermined intervals, or in response to a certain event, such as a corresponding request from an operator or the like.

That is, according to examples of embodiments, an information or indication is provided to any network element or function, communication function or application which may be interested in the information (e.g. all network elements or functions, communication functions or applications which may be potential signalling partners of an instantiated network function, communication function or application), that one or more virtualized network functions (such as the MME 30, the SGW 40, the PGW 50 etc), communication functions or applications are instantiated. The information is provided, for example, by the GO 70 e.g. via OAM interface and can be retrieved from an internal or external database.

Similarly, according to some examples of embodiments, other network entities are informed about the instantiation of the virtualized network functions (such as MME 30) for similar purposes. For example, any HSS (virtualized or not) is informed accordingly about the instantiation of the MME.

According to some further examples of embodiments, alternatively or additionally to the above described procedures, the database 80 is implemented for supporting the control process in case a virtualized network function, communication function or application is instantiated.

For example, the database 80 is maintained by the GO (or NUC) 70 in order to list a status of current and formerly instantiated NFs, communication functions or applications. For instance, if a particular MME/SGSN or SGW-C or PGW-C (or SGW and PGW) is active it is marked as such in the database. In addition, in case the GO 70 determines that a virtualized network function, communication function or application is instantiated, the GO 70 updates the corresponding entry in the database 80. It is to be noted that the database may be a centralized database (as indicated in FIG. 2) and/or may be implemented as a local database to several or all of the network elements of the communication network. Information to the database 80 from the GO 70 is transmitted e.g. by signalling M90 (in case of a centralized database) or by means of signalling related to signalling according to arrow 75 in FIG. 2 (in case of local databases).

Hence, in case any of the existing network elements or functions, communication functions or applications needs to communicate with a "potentially" virtualized network function, communication function or application, the network element or function, communication function or application may send a query to the (central) database 80 (or queries a local database) in order to learn which network functions, communication functions or applications in question are instantiated, as well as corresponding address information for contacting the virtualized network function. That is, the indication regarding the state of the virtualized network function, communication function or application is obtained by means of the corresponding query to a central (i.e. external) or local (i.e. internal) database. Thus, as described above, it is possible to recognize that there is a corresponding (new) NF, communication function or application, which can be considered in a selection process or the like.

Figure 3:
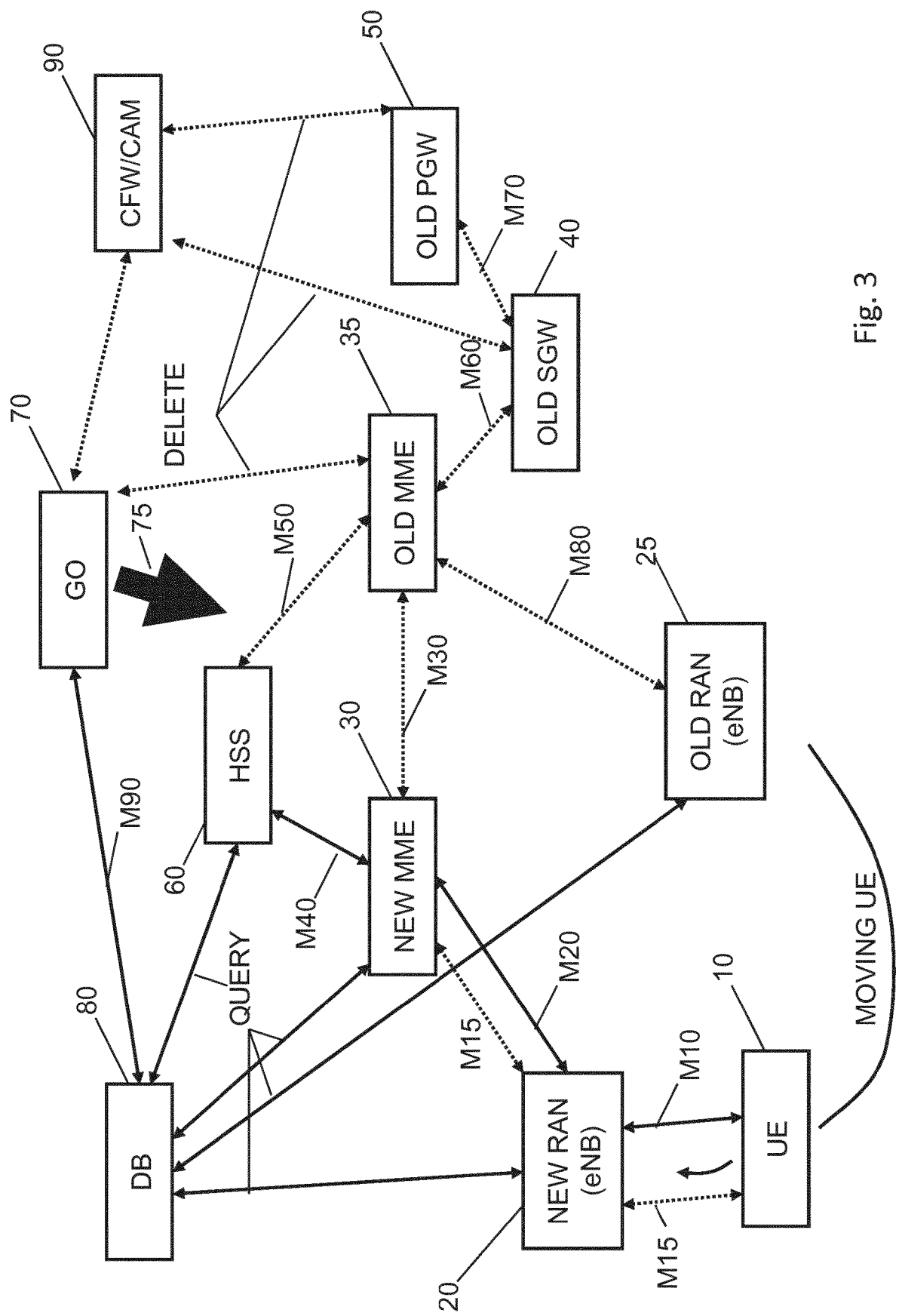
FIG. 3 shows a diagram illustrating a configuration of a communication network where some further examples are implementable.

FIG. 3 shows a diagram illustrating a configuration of a communication network where some further examples are implemented. It is to be noted that the configuration shown in FIG. 3 is at least partly equivalent to that described in FIG. 2, and only those devices, network elements and/or parts are shown in FIG. 3 which are useful for understanding principles underlying the present examples. As also known by those skilled in the art, there may be several other network elements, functions or devices involved in a communication network which are omitted here for the sake of simplicity.

Also in FIG. 3, a communication network configuration is illustrated which is for example based on the 3GPP specifications. It is to be noted that the general functions of the elements described in connection with FIG. 3 as well as of reference points/interfaces between the elements are known to those skilled in the art so that a detailed description thereof is omitted here for the sake of simplicity.

As shown in FIG. 3, in the exemplary communication network system, a communication element such as a UE 10 is located in a communication area which is controlled by a respective communication network control element of an (radio) access network (RAN) comprising e.g. a base station or eNB 20 or 25. It is to be noted that the UE may change its location within the network from one communication area or cell to another. In the illustrated example, the eNB 20 will be referred to as a new RAN element or eNB indicating that it is the RAN to which the UE 10 has changed or switched, while the eNB 25 will be referred to as an old RAN element or eNB indicating that it is the RAN from which the UE 10 has changed or switched (indicated also by the arrow at the UE 10).

The respective RAN elements 20 and 25 are connected with core network elements of the EPC. The core network elements comprises, for example, MMEs 30 and 35, wherein MME 30 is assumed to be connected to the new eNB 20 and thus referred to as new MME 30, while MME 35 is assumed to be connected to the old eNB 25 and thus referred to as the old MME 35 in FIG. 3. The MMEs 30 and 35 are connected with HSS 60. Furthermore, the MMEs are also connected to a SGW which in turn is connected to a PGW. In the example illustrated in FIG. 3, only SGW 40 and PGW 50 are illustrated, which are related to the old MME 35.

It is to be noted that the above described architecture indicated in FIG. 3 may be one being based on e.g. the 3GPP specification TS 23.401 (see e.g. version 12.3.0), to which reference is made herewith.

Moreover, it is to be noted that according to further examples, at least one of the network elements (i.e. core network elements or access network elements) is at least partly implemented by using a virtualized network function. In the following, it is assumed that the old MME 35 is such a virtualized network function. However, also other network elements can be implemented as virtualized network functions in addition or alternatively to the MME 35.

Further elements shown in FIG. 3 are the global orchestrator element or function (GO or NUC) 70, the database 80 and the CAM (CFW) 90.

The GO 70 is used to (directly or indirectly via the CAM 90) manage the virtualization of network functions, communication functions or applications i.e. to instantiate (setup) and de-instantiate (delete) the respective NFs, communication functions or applications, e.g. in a cloud environment and to generate and manage the links to other network elements and functions of the communication network.

It is to be noted that the GO 70 is able to instantiate/de-instantiate any virtualized network function via the CFW/CAM 90. Furthermore, there are also links between the respective network elements or function (wherever they may be located, i.e. in a physical entity or in a cloud/datacenter) which are not completely indicated in FIG. 3.

As described above, the GO 70 is also able to provide information regarding the virtualized NF, communication function or application to other network elements and functions, communication functions or applications (which will be described later). This is indicated by arrow 75 which represents an indication for a corresponding communication or signaling to the network elements or functions being involved (for example, a signaling to the MME 30 is concerned, in accordance with the following description, but also other network elements or functions may be recipients of a corresponding signaling caused by the GO 70). The goal of this signaling is, for example, to inform the respective network element or function about the de-instantiation of a virtualized network function so as to suppress the sending of message (such as an identification request message) towards the de-instantiated network function (e.g. the old MME 35) as will be described below.

As also described above, the database 80 is used, for example, by the GO 70 as storage for status information related to the virtualized network functions. Again, the database 80 may consist of one or more centralized databases within the communication network, or by local databases located at respective network elements and entities, or a combination thereof. In case of (plural) local databases included in respective network elements, the status information related to the virtualized network function can be written and updated by means of a suitable signaling, e.g. in association with the signaling indicated with arrow 75.

In the following, as an initial starting point, it is assumed that the UE 10 is connected to the eNB 25 and registered/attached to the communication network via the MME 35, the SGW 40 and the PGW 50 by using a network attachment procedure as described, for example, in corresponding specifications (see e.g. 3GPP TS23.401 v12.3.0).

Now, it is assumed that the UE 10 is turned off or the like and moved to another communication area, e.g. to that of eNB 20. Here, it is not connected to the old MME 35. Instead, the UE 10 has to register with a new MME, i.e. the new MME 30. In this procedure, at M10, the UE 10 sends an attach request to the new eNB 20. The attach request comprises, for example, an identification element or identification data which allows the receiving network elements (here the eNB 20 and also the MME 30) to detect that the requesting communication element was already attached or connected to the network. For example, the identification element or data comprises an identification of network elements or functions, such as of an MME (here the old MME 35) which can be used by the eNB 20 and/or the new MME 30 for conducting the network attach procedure. As one example, a corresponding identification is comprised in a GUTI being provided in the "old" attachment to the MME 35. It is to be noted that the new MME 30 will be able to know, for example, due to the content of a GUTI in the old MME. Furthermore, the eNB may select the new MME based on an indication in the GUTI, e.g. the old GUMMEI.

FIG. 4 shows a diagram illustrating a structure of a GUTI being usable as an example of identification data usable in some examples.

Basically, the purpose of the GUTI is to provide an unambiguous identification of the UE that does not reveal the UE or the user's permanent identity in the communication network. It also allows the identification of the MME and network, and is used by the network and the UE to establish the UE's identity during signaling between them in the communication network. The GUTI has two main components. One is the GUMMEI being constructed from MCC, MNC and an MME identifier comprising an MME group ID and an MME code, which uniquely identifies the MME which allocated the GUTI. The other one is the M-TMSI that uniquely identifies the UE within the MME that allocated the GUTI.

Back to FIG. 3, after receiving the attach request, the new eNB 20 derives the MME from identification information, e.g. the GUMMEI. Assuming that MME is not associated with the eNB 20, a new MME is selected, e.g. the new MME 30, and the attach request is forwarded in M20 to the new MME 30.

The new MME 30 may determine the old MME 35 by using the GUTI received from the UE 10 to derive the old MME address, and send an identification request to the old MME in M30. The old MME 35 responds with an identification response (see M30).

The new MME 30 may send an attach accept message to the new eNB 20 (M20), wherein again identification data such as a "new" GUTI is included if the new MME 30 allocates a new GUTI. Furthermore, a location update procedure with the HSS 60 is conducted (see M40).

In the meantime, the old MME 35 may conduct a cancel location procedure (M50) with HSS 60, and a session delete procedure with the old SGW 40 and old PGW 50 (see M60 and M70).

It is to be noted that the above described attach procedure is only a simplified example. A more detailed procedure may be based, for example, on that described in 3GPP TS23.401 v12.3.0.

As indicated above, according to some examples of embodiments, at least one of the network elements shown in FIG. 3 is assumed to be a virtualized network function, for example the old MME 35.

Assuming now a situation where the virtualized old MME 35 had been de-instantiated (e.g. because it was not needed anymore) in the meantime, i.e. before the UE 10 starts the attach procedure with the new RAN (eNB 20) after having been deactivated or the like. In this case, the new MME 30 would not succeed with its communication attempt towards the old MME 35. That is, the signaling related to M30 is not responded. In this case, a delay in the set-up procedure for the UE 10 with the new eNB 20 occurs, e.g. due to repeated communication attempts by the new MME 30, which would inhibit to decrease an overall delay in user experience when implementing virtualized network functions. For example, it may be required that any entity sending e.g. a GTP-C signaling message is mandated to reliable transfer the message. That especially means that the sender has to repeat sending until it is was successfully acknowledged or the entity detects the final failure after several retries. Anyhow, this leads to a delay of the set-up.

According to some examples, this situation may be overcome by the following measures. When it is determined that a virtualized network function providing services related to a communication network (such as the MME 35) is de-instantiated or will be de-instantiated, a specific indication informing about the de-instantiation of the virtualized network function is prepared and sent to network entities, elements or functions or databases which can use this information so as to avoid unsuccessful communication attempts as that described above with regard to the signaling in M30.

It is to be noted that the determination of the de-instantiation of the virtualized network function is achievable by different measures, according to examples of embodiments of the invention. Basically, any measure allowing the respective control network element or function (such as the GO 70) to know that a virtualized network element or function is de-instantiated or will be de-instantiated is suitable for the determination of the de-instantiation of the virtualized network function. For example, the determination is achieved when the GO 70 (or another control entity) decides that the virtualized network function is not needed anymore and hence to be de-instantiated, wherein a corresponding de-instantiation procedure for the virtualized network function is then to be conducted, resulting in the determination that the virtualized network function is de-instantiated. Alternatively, the de-instantiation of the virtualized network function is initiated by other means (a datacenter operator, due to a failure, etc.), and a corresponding information is obtained by the GO 70 or the like, wherein then the determination that the virtualized network function is de-instantiated is achieved by recognizing the corresponding information. As a further alternative, the GO 70 (or another control entity) conducts a measurement or the like in order to detect whether the virtualized network element is still existing, wherein in case the measurement is negative, this is used as determination that the virtualized network function is de-instantiated.

According to some examples, as the indication, a detach procedure, which is initiated by a corresponding network element or function, is conducted. One of possible network elements or functions capable of initiating such a detach procedure is, for example, the HSS 60, which starts a HSS-initiated detach procedure.

By means of the detach procedure, subscription data in at least one network element or function can be removed, for example subscription data in the HSS 60, the MME 35, the UE 10 are removed. The indication or command to conduct the detach procedure is for example accompanied by a cause code or the like, such as a cause "subscription withdrawn", which is caused to be transmitted before the virtualized MME 35 is de-instantiated. The detach procedure may be instructed, for example, by the GO 70 via a cloud application manager (CAM/CFW 90) and/or an OAM centre (not shown).

One example of subscription data is the GUTI (see e.g. FIG. 3). The GUTI contains the ID of the last/old MME (MME Code and MME group ID). By means of the detach procedure (e.g. the HSS-initiated detach procedure) with "subscription withdrawn", the old GUTI is deleted at the UE 10.

According to some further examples, the detach procedure is executed in a combined manner. That is, a command is provided which allows to execute a bulk detach procedure (e.g. a bulk "HSS-initiated detach" command) for the whole virtualized network function to be de-instantiated (e.g. for the MME 35). That is, it is not necessary to individually detach each and every UE from the network. Instead, by using such a new bulk command, all UE currently registered with the virtualized MME which is to be de-instantiated are detached at once. For example, in case of bulk instruction, an ID of the element being de-instantiated (e.g. the old MME 35) is provided. Network elements or functions receiving an instruction related to the bulk detach procedure then searches its subscription data (e.g. in a corresponding subscription database) for network elements (UEs and/or other network elements) being associated with the function to be de-instantiated on the basis of this ID. For the positive results of the search, the detach procedure is conducted.

Alternatively or additionally to the above described detach procedure, according to some further examples, the indication provided allows to suppress a communication attempt to the de-instantiated virtualized network function directly in the new network element (e.g. in the new MME 30). That is, for example, the query (identification request in M30) to the old MME 35 is inhibited.

For example, a UE may decide on itself to detach from the virtualized MME 35 at any arbitrary time even before a detach procedure like that described above (e.g. a HSS-initiated detach procedure) was triggered. In that case, the identification data (such as the GUTI) is not deleted in the UE and not necessarily deleted immediately in the MME (and the HSS). Therefore, there are still cases were the UE 10 may register with a new MME 30 with its old identification data (the old GUTI allocated by the old virtualized MME 35). Still, since the old MME 35 is de-instantiated at this time, the new MME 30 is not able to contact the old (virtualized) MME 35.

That is, an information is provided to any network element or function which may be interested in the information (e.g. all network elements or functions which may contact the de-instantiated network function, such as network elements or functions having the same task, like remaining MMEs (virtualized or physical) of the network), are informed that one or more virtualized network functions (such as the MME 35) had been de-instantiated in the meantime. The information is provided, for example, by the GO 70 e.g. via OAM interface.

Hence, when the new MME 30 receives an initial attach request (M20 in FIG. 3), before starting to send the identification request to any old MME (or SGSN) indicated e.g. in identification information or data received from the UE 10 (such as the GUTI), the new MME 30 checks (internally or externally) whether the indicated MME/SGSN is a (virtualized or not virtualized) MME/SGSN for which an information has been received that it exist or is de-instantiated. In case it was reported that the MME/SGSN in question is not to instantiate anymore, the new MME 30 skips the sending of the identification request towards the old MME/SGSN completely as it will not be successful at all.

Similarly, according to some other examples, other network entities are informed about the de-instantiation of the virtualized network functions (such as MME 35) for similar purposes. For example, any HSS (virtualized or not) is informed accordingly about the de-instantiation of the MME.

According to some further examples, alternatively or additionally to the above described procedures, database 80 as shown in FIG. 3 is implemented for supporting the control process in case a virtualized network function is de-instantiated.

For example, the database 80 is maintained by the GO (or NUC) 70 in order to list a status of current and formerly instantiated NF. For instance, if a particular MME/SGSN or SGW-C or PGW-C (or SGW and PGW) is active it is marked as such in the database. In addition, in case the GO 70 decides or recognizes by other means that a virtualized network function does not longer exist, the GO 70 updates the corresponding entry in the database 80. It is to be noted that the database may be a centralized database (as indicated in FIG. 3) and/or may be implemented as a local database to several or all of the network elements of the communication network. Information to the database 80 from the GO 70 is transmitted e.g. by signalling M90 (in case of a centralized database) or by means of signalling related to signalling according to arrow 75 in FIG. 3 (in case of local databases).

Hence, in case any of the existing network elements or functions needs to contact a "potentially" virtualized network function (which, as described above, may no longer be instantiated), the network element sends a query to the central database 80 (or queries a local database) in order to learn whether the network function in question is still instantiated. That is, the indication regarding the state of the virtualized network function is obtained by means of the corresponding query to a central (i.e. external) or local (i.e. internal) database. Thus, as described above, it is possible to recognize that it is not needed to try to contact the corresponding NF, since it was already torn down (de-instantiated). That is, a network element or function, such as the new MME 30, queries the central or local database in order to learn/detect whether the old MME 35 is torn down or not, which allows to suppress unneeded retries and a corresponding delay. In case the information is obtained that the old MME 35 is de-instantiated, the new MME 35 may also start a default identification request procedure with the UE 10 as early as possible (e.g. by means of signalling M15).

According to further examples, in case the MME 35 is de-instantiated, also the RAN (such as the eNB 25 via the S1-MME interface) is impacted. Therefore, in the virtualised environment, the eNB is informed about the de-instantiation as well.

For example, in case of the initialisation of a SCTP association, the eNB 25 retransmit repeatedly messages via the S1-MME (see e.g. signalling on M80) until the eNB 25 finally considers that the endpoint is unreachable. In this case, it enters a CLOSED state and may possibly report the failure to an upper layer. Thus, the eNB 25 may repeat to send messages to the MME 35 although the GO/NUC already knows about the possible/intended/factual termination of the MME 35. Therefore, the RAN (e.g. eNB 25) obtains the information of the de-instantiation of the MME 35 and can thus avoid an unsuccessful communication attempt and hence a waste of resources. For example, the eNB 25 may query the database 80, e.g. when a communication attempt to the MME 35 was not acknowledged or before any communication attempt towards the MME 35 is started.

While above described examples are related to a de-instantiation of an MME (i.e. MME 35) as a virtualized network function, as indicated beforehand, also other scenarios are possible. For example, according to further examples, in case it is determined that, as a virtualized network function, e.g. a network function like a PGW(-C/U) or SGW(-C/U) is de-instantiated (for example, the GO 70 decides or knows about the de-instantiation thereof), a network element or function which requires such an information, like an MME, is informed that the corresponding PGW(-C/U) or SGW(-C/U) functions are de-instantiated. The reason is that in case a PGW and SGW selection process is located in the network element or function in question (e.g. at the MME), the de-instantiated network function (i.e. the PGW(-C/U) or SGW(-C/U)) should not be considered in the selection process, as the corresponding instance ceased to exist.

It is to be noted that while the above described example is related to a scenario implemented in an LTE system (i.e. eNB and EPC), examples of embodiments are also applicable to other communication systems and implementations. For example, examples of embodiments can be implemented in IMS or the like, for instance with regard to virtualized functions related to an P-CSCF, IBCF, BGCF, MGCF and on the like. In the IMS, it is to be noted that an UE performs a (SIP) registration procedure which is comparable to the LTE/EPC/eNB attachment procedure described above, so that the same principles as described with regard to the attachment procedure can be applied there as well.

Consequently, the same procedures as described above with regard to NFV in LTE systems may be used for other systems, such as for NFV in IMS, and the same principle can be applied.

As a matter of course, in the above described scenarios where a network function is de-instantiated, a selection of a new network function replacing the de-instantiated network function can be conducted by considering newly instantiated network functions being learned by a corresponding check, as described in connection with FIG. 2, for example.

Now, examples of embodiments implementing the processing described in connection with e.g. FIG. 2 are described in further detail with regard to FIGS. 5 to 8.

Figure 5:
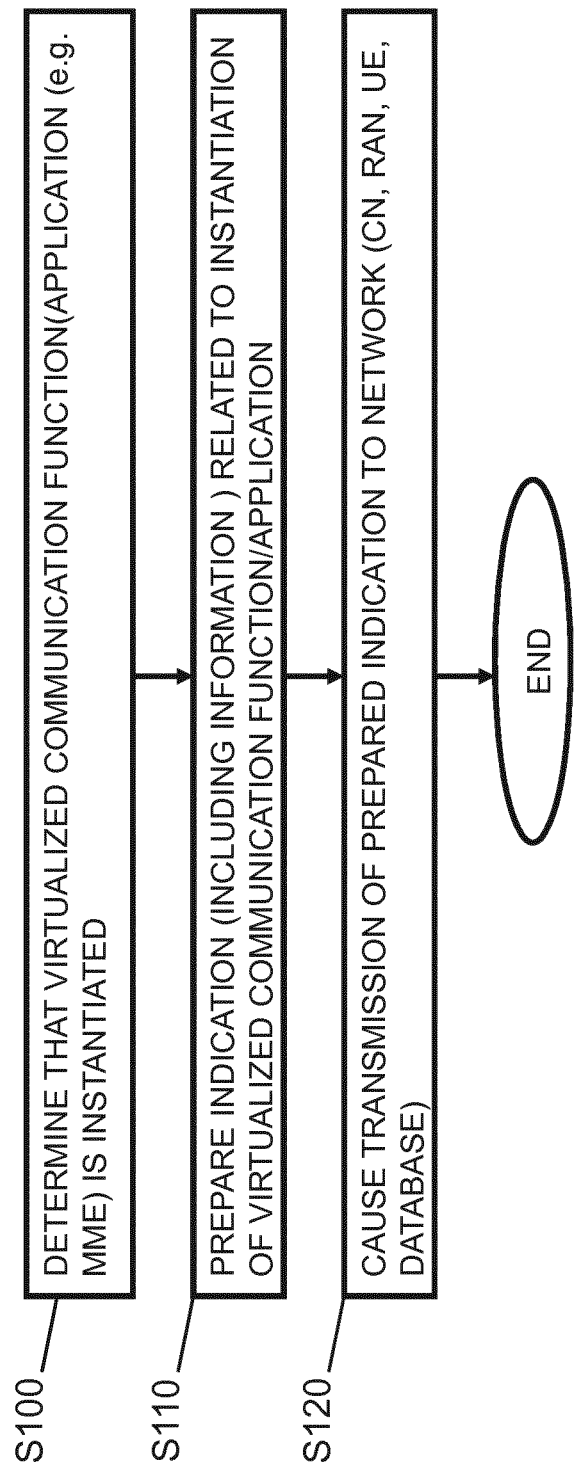
FIG. 5 shows a flow chart of a processing conducted in a communication network control element or function acting as an indication provider according to some examples of embodiments.

FIG. 5 shows a flow chart of a processing conducted in a communication network control element or function acting as an indication provider indicating the instantiation of a (new) virtual network function, according to some examples of embodiments. For example, the processing is executed by one of a communication network control element or communication network control function acting as a global orchestrator (GO) for implementing virtualized communication functions or applications, an OAM element or function of a communication network, or a communication network control element or communication network control function of a communication network using virtualized communication functions or applications. According to some examples of embodiments, the virtualized network function, communication function or application being instantiated is related to a communication network control function of the communication network (e.g. core network function, access network function, IMS network function, etc.), a M2M communication function, an OTT application, a terminal function etc.

In S100, it is determined that at least one virtualized communication function or application (e.g. a virtualized network function) providing services related to a communication network is instantiated. According to some examples, the determination is based on a signaling from the instantiated virtualized communication function or application or the like. On the other hand, according to some examples, the determination is based on a procedure where the network element or function, such as a GO element or function, conducts a setting up of at least one new virtualized communication function or application providing services related to a communication network, wherein then the determination that at least one virtualized communication function or application providing services related to a communication network is instantiated is made when the setup of the new virtualized communication function or application is completed.

In S110, an indication related to the instantiation of the at least one virtualized communication function or application is prepared. According to some examples, the indication comprises at least one of information indicating a type of the at least one virtualized communication function or application, information indicating a type of services provided by the at least one virtualized communication function or application (e.g. which type of service an OTT application provides, whether a network function related to an SGW is for SGW-C, SGW-U service, etc.), address information associated to the at least one virtualized communication function or application, and identification information related to a virtual network operator operating the at least one virtualized communication function or application.

In S120, a transmission of the prepared indication is caused to at least one of a network element of the communication network, a network function of the communication network, a communication function or application (e.g. an OTT application) and a database to which network elements or network functions, communication functions or applications in the communication network have access. Furthermore, according to some examples, the transmission of the prepared indication to a domain name server element or function is caused. For example, the prepared indication is caused to be sent to at least one of a communication element comprising a terminal device or user equipment capable of communicating in the communication network, a network element or network function of a radio or fixed access network part of the communication network, a network element or network function of a core network part of the communication network, a network element or network function of an IP multimedia system part of the communication network, a communication function or application, and a database to which network elements or network functions, communication functions or applications of the communication network have access, wherein the database is comprised in at least one of a centralized database of the communication network and a local database comprised in one or more of the network elements or network functions of the communication network.

Figure 6:
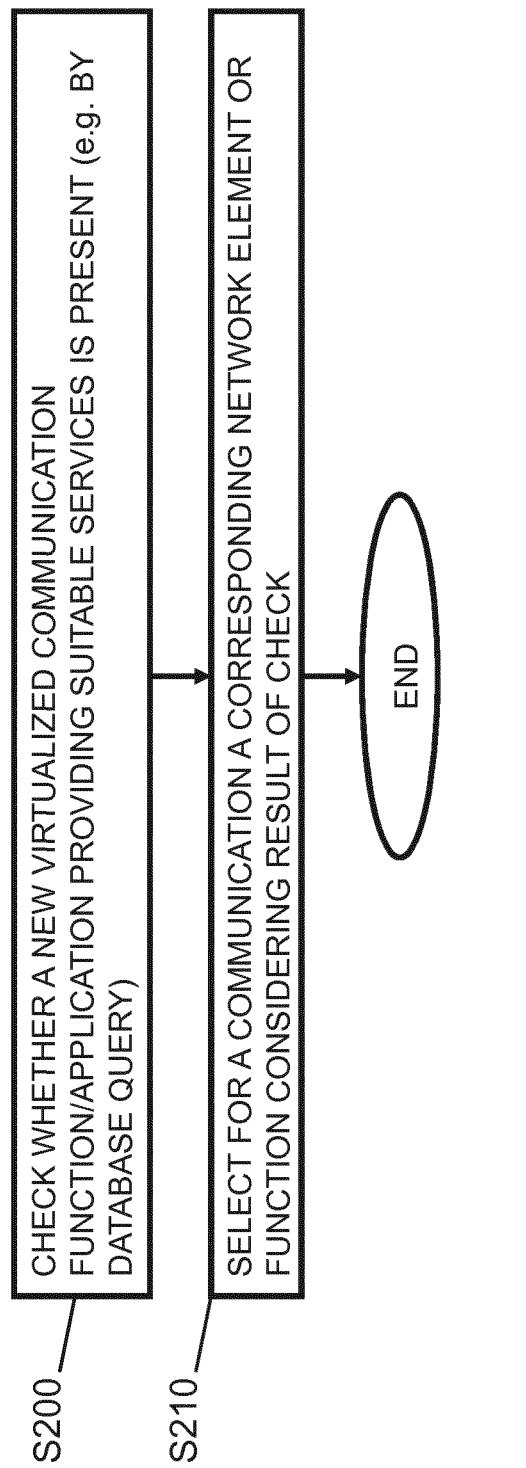
FIG. 6 shows a flow chart of a processing conducted in a communication network control element or function acting as a network element or function selector according to some examples of embodiments.

FIG. 6 shows a flow chart of a processing conducted in a communication element or a communication network control element or function, a communication function, an application etc. acting as a network function selector, according to some examples of embodiments. For example, the processing is executed by one of a communication element comprising a terminal device or UE capable of communicating in a communication network, a RAN or fixed access network element or network function of the communication network, a network element or network function of a core network part of the communication network, a network element or network function of an IP multimedia system part of the communication network, a communication function or application, such as an OTT application/function on top of a network. According to some examples of embodiments, the virtualized communication function or application being selectable is related to a communication network control function of the communication network (e.g. core network function, access network function, IMS network function, etc.).

In S200, it is checked, when a communication is to be conducted with a network element or network function, a communication function or application in a communication network, whether at least one new virtualized communication function or application providing suitable services related to the communication network is indicated to be instantiated.

According to some examples, there is received an initial attach request related to an establishment of a communication connection of a communication element to a communication network. In the processing of the request, the checking for a new virtualized communication function or application is triggered. Alternatively or additionally, the checking for a new virtualized communication function or application is triggered on a time basis or in response to a predetermined event.

Alternatively or additionally, an indication related to an instantiation of at least one virtualized communication function or application providing services related to a communication network is received. The obtained indication is processed for determining or recognizing the virtualized communication function or application being instantiated, which in turn can then be considered for a selection procedure. The indication comprises, for example, at least one of information indicating a type of the at least one virtualized communication function or application, information indicating a type of services provided by the at least one virtualized communication function or application (e.g. which type of service an OTT application provides, whether a network function related to an SGW is for SGW-C, SGW-U service, etc.), address information associated to the at least one virtualized communication function or application, and identification information related to a virtual network operator operating the at least one virtualized communication function or application.

According to some examples, the indication related to the instantiation of the at least one virtualized communication function or application is obtained from one of a communication network control element or communication network control function acting as a global orchestrator for implementing virtualized communication functions or applications, an operation and maintenance element of the communication network, a domain name server of the communication network, and a communication network control element or communication network control function of the communication network in which virtualized communication functions or applications are implemented.

According to some further examples, the check for a new virtualized communication function or application comprises a query at a database to which network elements or network functions of the communication network, communication functions or applications have access, wherein the database is comprised in at least one of a centralized database of the communication network and a local database comprised in one or more of the network elements or network functions of the communication network. As a result of the query, for example, information corresponding to the above defined indication related to an instantiation of at least one virtualized communication function or application is obtained from the database.

In S210, on the basis of the result of the check, i.e. under consideration of (new) virtualized communication functions or applications, a network element or network function of the communication network, a communication function or an application with which a communication is to be conducted is selected.

Figure 7:
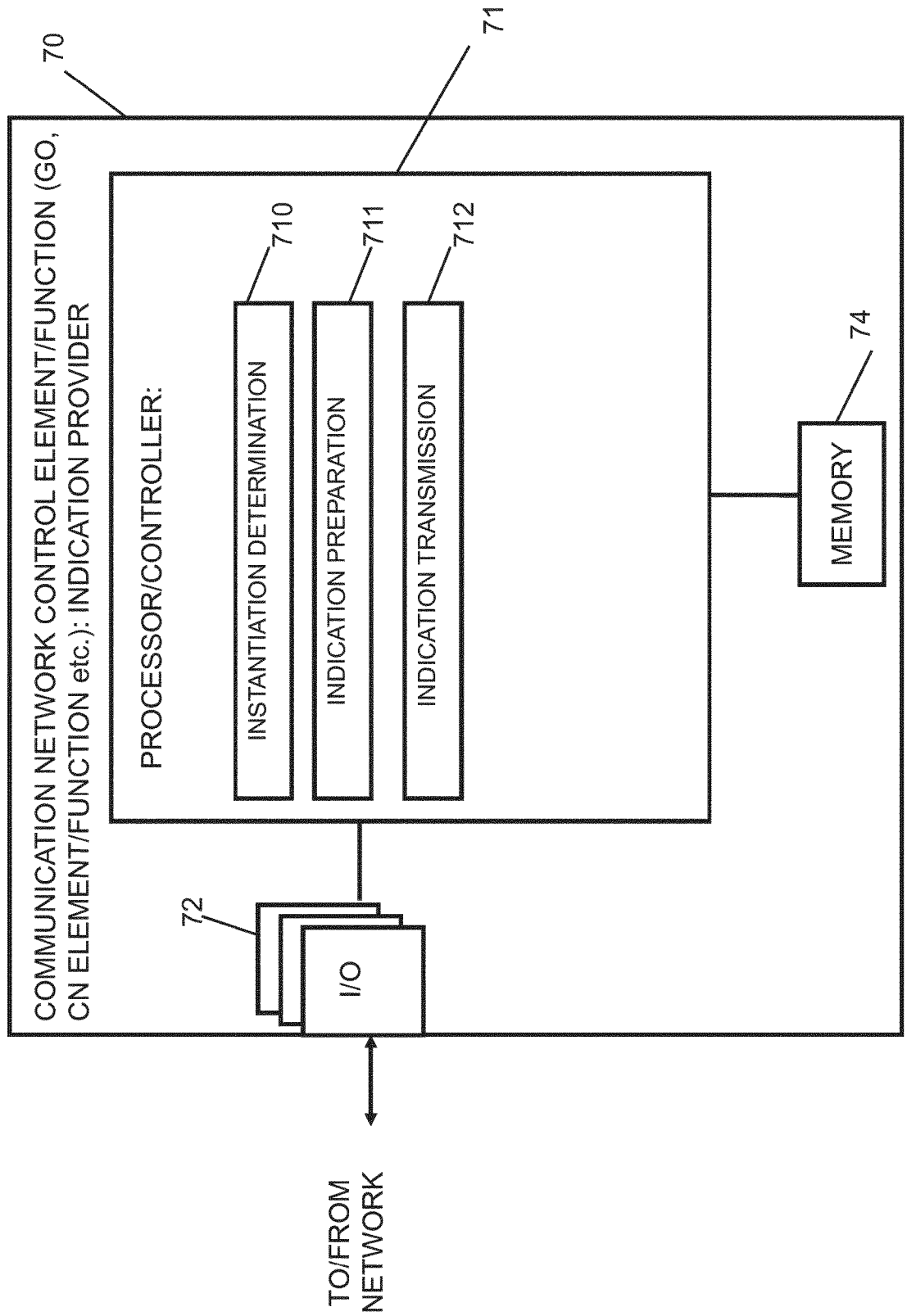
FIG. 7 shows a diagram of a communication network control element or function acting as an indication provider according to some examples of embodiments.

FIG. 7 shows a diagram of a communication network control element or function acting as an indication provider according to some examples of embodiments, which is configured to implement the control procedure as described in connection with some of the examples of embodiments. It is to be noted that the communication network control element or function, like the GO 70 etc. (e.g. a core network element or function, an access network element or function, an IMS network element or function, etc.), which is shown in FIG. 7, may comprise further elements or functions besides those described herein below. Furthermore, even though reference is made to a communication network control element or function, the element or function may be also another device or function having a similar task, such as a chipset, a chip, a module etc., which can also be part of a communication network control element or function or attached as a separate element or function to a communication network control element or function, or the like. It should be understood that each block and any combination thereof may be implemented by various means or their combinations, such as hardware, software, firmware, one or more processors and/or circuitry.

The communication network control element or function shown in FIG. 7 may comprise a processing circuitry, a processing function, a control unit or a processor 71, such as a CPU or the like, which is suitable for executing instructions given by programs or the like related to the control procedure. The processor 71 may comprise one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 72 denotes transceiver or input/output (I/O) units or functions (interfaces) connected to the processor or processing function 71. The I/O units 72 may be used for communicating with one or more network elements, such as communication elements like UEs, RAN element, core network elements or functions, databases/datacenters and the like. The I/O units 72 may be a combined unit comprising communication equipment towards several network elements, or may comprise a distributed structure with a plurality of different interfaces for different network elements. Reference sign 74 denotes a memory usable, for example, for storing data and programs to be executed by the processor or processing function 71 and/or as a working storage of the processor or processing function 71.

The processor or processing function 71 is configured to execute processing related to the above described control procedure. In particular, the processor or processing circuitry or function 71 comprises a sub-portion 710 as a processing portion which is usable for conducting an instantiation determination. The portion 710 may be configured to perform processing according to S100 of FIG. 5. Furthermore, the processor or processing circuitry or function 71 comprises a sub-portion 711 usable as a portion for preparing an indication. The portion 711 may be configured to perform processing according to S110 of FIG. 5. Furthermore, the processor or processing circuitry or function 71 comprises a sub-portion 712 usable as a portion for transmitting the prepared indication. The portion 712 may be configured to perform a processing according to S120 of FIG. 5.

Figure 8:
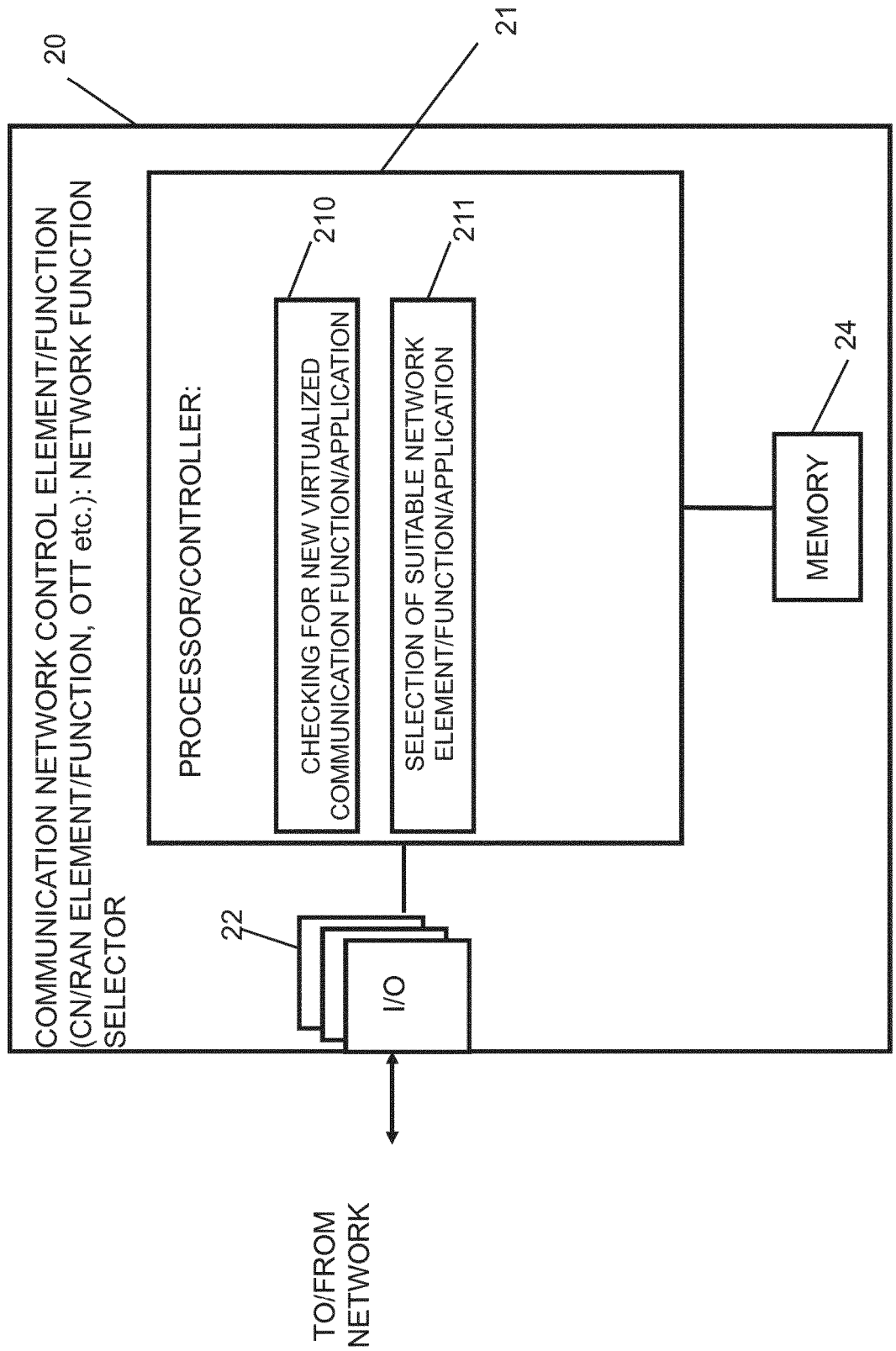
FIG. 8 shows a diagram of a communication network control element or function acting as a network element or function selector according to some examples of embodiments.

FIG. 8 shows a diagram of a communication element/function, application or a communication network control element or function acting as a network function selector according to some examples of embodiments, which is configured to implement the control procedure as described in connection with some of the examples of embodiments. It is to be noted that the communication element/function, application or communication network control element or function, like a terminal device or user equipment 10, a physical network element or virtualized network function being a core network control element or function like the SGW 40, PGW 50, MME 30 and/or SGW-C, SGW-U etc., an access network element like a RAN network element, such as an eNB (e.g. eNB 20), an OTT application etc., which is shown in FIG. 8, may comprise further elements or functions besides those described herein below (for the sake of convenience, the eNB 20 is used in the following as an example of the network function selector). Furthermore, even though reference is made to a communication element or a communication network control element or function, the element or function may be also another device or function having a similar task, such as a chipset, a chip, a module etc., which can also be part of a communication network control element or function or attached as a separate element or function to a communication network control element or function, or the like. It should be understood that each block and any combination thereof may be implemented by various means or their combinations, such as hardware, software, firmware, one or more processors and/or circuitry.

The communication network control element or function shown in FIG. 8 may comprise a processing circuitry or function, a control unit or a processor 21, such as a CPU or the like, which is suitable for executing instructions given by programs or the like related to the control procedure. The processor 21 may comprise one or more processing portions or functions dedicated to specific processing as described below, or the processing may be run in a single processor or processing function. Portions for executing such specific processing may be also provided as discrete elements or within one or more further processors, processing circuitries or functions or processing portions, such as in one physical processor like a CPU or in one or more physical or virtual entities, for example. Reference sign 22 denotes transceiver or input/output (I/O) units or functions (interfaces) connected to the processor or processing function 21. The I/O units 22 may be used for communicating with one or more network elements, such as communication elements like UEs, RAN elements, core network elements or functions, a GO element, an OAM element, an external database and the like. The I/O units 22 may be a combined unit comprising communication equipment towards several network elements, or may comprise a distributed structure with a plurality of different interfaces for different network elements. Reference sign 24 denotes a memory usable, for example, for storing data and programs to be executed by the processor or processing function 21 and/or as a working storage of the processor or processing function 21. It is to be noted that in case a local database for storing information regarding the state of the virtualized communication functions or applications is to be provided, a part of memory 24 may be used for this, or a separate storage entity (not shown) may be provided for this purpose. In this case, corresponding information can be written/updated, for example by means of a corresponding signaling from the GO 70.

The processor or processing circuitry or function 21 is configured to execute processing related to the above described control procedure. In particular, the processor or processing circuitry or function 21 comprises a sub-portion 210 as a processing portion which is usable for checking for new virtualized communication functions or applications. The portion 210 may be configured to perform processing according to S200 of FIG. 6. Furthermore, the processor or processing circuitry or function 21 comprises a sub-portion 211 usable as a portion for selecting a suitable network element/function/application for communicating. The portion 211 may be configured to perform processing according to S210 of FIG. 6.

According to an example of embodiments, there is provided an apparatus comprising means for determining that at least one virtualized communication function or application providing services related to a communication network is instantiated, means for preparing an indication related to the instantiation of the at least one virtualized communication function or application, and means for causing transmission of the prepared indication to at least one of a network element of the communication network, a network function of the communication network, a communication function, an application and a database to which network elements, network functions, communication functions or applications in the communication network have access.

Furthermore, according to an example of embodiments, there is provided an apparatus comprising means for checking, when a communication is to be conducted with a network element or network function, a communication function or application in a communication network, whether at least one new virtualized communication function or application providing suitable services related to the communication network is indicated to be instantiated, and means for selecting, on the basis of the result of the check, the network element or network function, communication function or application in the communication network with which a communication is to be conducted.

It should be appreciated that

- an access technology via which signaling is transferred to and from a network element may be any suitable present or future technology, such as WLAN (Wireless Local Access Network), WiMAX (Worldwide Interoperability for Microwave Access), LTE, LTE-A, Bluetooth, Infrared, and the like may be used; Additionally, embodiments may also apply wired technologies, e.g. IP based access technologies like cable networks or fixed lines.
- as examples for virtualized communication functions or applications, besides network functions related to an access or core network of a communication element, also functions related to a machine equipment corresponding to an M2M architecture or functions/applications related to OTT can be used.
- a user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node is a layer 3 relay (self-backhauling relay) towards a base station or eNB. The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network, or a nearly exclusive downlink only device, such as a portable video player. Also equipment used for measuring certain values, such as sensors which can measure a temperature, a pressure etc., can be used as a corresponding user device. It should be appreciated that a device may be regarded as an apparatus or as an assembly of more than one apparatus, whether functionally in cooperation with each other or functionally independently of each other but in a same device housing.
- embodiments suitable to be implemented as software code or portions of it and being run using a processor or processing function are software code independent and can be specified using any known or future developed programming language, such as a high-level programming language, such as objective-C, C, C++, C#, Java, etc., or a low-level programming language, such as a machine language, or an assembler.
- implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).
- embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described,
- an apparatus may be implemented by a semiconductor chip, a chipset, or a (hardware) module comprising such chip or chipset;
- embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.
- embodiments may also be implemented as computer program products, comprising a computer usable medium having a computer readable program code embodied therein, the computer readable program code adapted to execute a process as described in embodiments, wherein the computer usable medium may be a non-transitory medium.

Although the present invention has been described herein before with reference to particular embodiments thereof, the present invention is not limited thereto and various modifications can be made thereto.

For example, while in the above described examples of embodiments an MME is used as an example for the virtualized network function being instantiated, the invention is not limited thereto. For example, other network entities such as, SGSN, GGSN, SGW, PGW, SGW-C, SGW-U, PGW-C, PGW-U etc., or a RAN element like an eNB may be used as examples of a virtualized network function to which the described examples of embodiments are applicable. As indicated above, examples of embodiments of the invention are also applicable for other network systems, such as an IMS based system, where elements like a P-CSCF, IBCF, BGCF, MGCF etc may be instantiated as virtualized network functions where examples of embodiments of the invention are applicable.

Furthermore, it is to be noted that examples of embodiments of the invention are also applicable in the following case. For instance, as described above, examples of embodiments are applicable to both core network (e.g. the EPC) and multimedia system (e.g. IMS) functions in an independent and separated manner. However, according to network configurations, it may be required, for example, that addresses of elements of one part (e.g. IMS network part) are indicated by elements of another part (e.g. EPC part); as one example, it may be required that e.g. a PGW (EPC part) is mandated to signal back the address of a P-CSCF (IMS) to the UE. That means, however, that once at least parts of the IMS are set up on demand (i.e. dynamically instantiated), the PGW needs to be informed about the existence or non-existence (de-instantiation) of the P-CSCF.

That is, according to further examples, the PGW (or a corresponding other network element or function) has to be dynamically configured by e.g. the GO or the like with a correlation of APN and the corresponding P-CSCF or a list of P-CSCFs. This list shall be provided to UEs on request.

Similar to that, any PGW/BRAS/BNG (or a corresponding other network element or function) has to be (may be) dynamically configured by e.g. the GO or the like with a correlation of APN and a corresponding OTT application or a list of OTT applications. Furthermore also the OTT application may be provided with the address of the PGW/BRAS/BNG.

The invention claimed is:

1. A method comprising:
obtaining in virtual network operation an indication related to an instantiation of at least one new virtualized communication function or application providing services related to a communication network, wherein the instantiated at least one new virtualized communication function or application is a potential signaling partner in virtual network operation in a communication conducted via a communication network,
processing the obtained indication for determining or recognizing the at least one new virtualized communication function or application being instantiated in virtual network operation,
checking, with regard to a communication to be conducted in the communication network with a network element or network function, a communication function or application in a communication network, whether the at least one new virtualized communication function or application is providing suitable services related to the communication in virtual network operation, and
selecting, on the basis of the result of the check, a network element or network function, communication function or application in the communication network with which a communication in virtual network operation is to be conducted.

2. The method according to claim 1, further comprising at least one of
receiving and processing an initial attach request related to an establishment of a communication connection of a communication element to a communication network in virtual network operation, wherein the initial attach request triggers the checking for a new virtualized communication function or application;
the checking for a new virtualized communication function or application is triggered on a time basis, or in response to a predetermined event, or when the communication is initiated;
the indication comprises at least one of information indicating a type of the at least one virtualized communication function or application, information indicating a type of services provided by the at least one virtualized communication function or application, address information associated to the at least one virtualized communication function or application, and identification information related to a virtual network operator operating the at least one virtualized communication function or application;
the indication related to the instantiation of the at least one virtualized communication function or application is obtained from one of a communication network control element or communication network control function acting as a global orchestrator for implementing virtualized communication functions or applications, an operation and maintenance element of the communication network, a domain name server of the communication network, and a communication network control element or communication network control function of the communication network in which virtualized communication functions or applications are implemented; and querying, when checking for a new virtualized communication function or application, a database to which network elements or network functions of the communication network, communication functions or applications have access, wherein the database is comprised in at least one of a centralized database of the communication network and a local database comprised in one or more of the network elements or network functions of the communication network, wherein an indication related to an instantiation of at least one virtualized communication function or application is obtained from the database.

3. The method according to claim 1, wherein
the method is executed by one of a communication element comprising a terminal device or user equipment capable of communicating in virtual network operation in the communication network, a network element or network function of a radio access network part of the communication network, a network element or network function of a fixed access network part of the communication network, a network element or network function of a core network part of the communication network, a network element or network function of an IP multimedia system part of the communication network, and a communication function or application communicating in the communication network,
wherein the at least one new virtualized communication function or application being instantiated is related to a communication network control function of the communication network in virtual network operation.

4. An apparatus comprising:
at least one processing circuitry, and
at least one memory for storing instructions to be executed by the processing circuitry, wherein
the at least one memory and the instructions are configured to, with the at least one processing circuitry, cause the apparatus at least:
to obtain an indication related to an instantiation of at least one new virtualized communication function or application providing services related to a communication network in virtual network operation, wherein the instantiated at least one new virtualized communication function or application is a potential signaling partner in virtual network operation in a communication conducted via a communication network,
to process the obtained indication for determining or recognizing the at least one new virtualized communication function or application being instantiated in virtual network operation,
to check, with regard to a communication to be conducted in the communication network with a network element or network function, a communication function or application in the communication network, whether the at least one new virtualized communication function or application is providing suitable services related for the communication in virtual network operation, and
to select, on the basis of the result of the check, a network element or network function, communication function or application in the communication network with which a communication in virtual network operation is to be conducted.

5. The apparatus according to claim 4, wherein the at least one memory and the instructions are further configured to, with the at least one processing circuitry, cause the apparatus to receive and process an initial attach request related to an establishment of a communication connection of a communication element to a communication network, wherein the initial attach request triggers the checking for a new virtualized communication function or application.

6. The apparatus according to claim 4, wherein the checking for a new virtualized communication function or application is triggered on a time basis, or in response to a predetermined event, or when the communication is initiated.

7. The apparatus according to claim 4, wherein the indication comprises at least one of
information indicating a type of the at least one virtualized communication function or application,
information indicating a type of services provided by the at least one virtualized communication function or application,
address information associated to the at least one virtualized communication function or application, and
identification information related to a virtual network operator operating the at least one virtualized communication function or application.

8. The apparatus according to claim 4, wherein the at least one memory and the instructions are further configured to, with the at least one processing circuitry, cause the apparatus
to obtain the indication related to the instantiation of the at least one virtualized communication function or application from one of
a communication network control element or communication network control function acting as a global orchestrator for implementing virtualized communication functions or applications,
an operation and maintenance element of the communication network,
a domain name server of the communication network, and
a communication network control element or communication network control function of the communication network in which virtualized communication functions or applications are implemented.

9. The apparatus according to claim 4, wherein the at least one memory and the instructions are further configured to, with the at least one processing circuitry, cause the apparatus
to query, when checking for a new virtualized communication function or application, a database to which network elements or network functions of the communication network, communication functions or applications have access, wherein the database is comprised in at least one of a centralized database of the communication network and a local database comprised in one or more of the network elements or network functions of the communication network, wherein an indication related to an instantiation of at least one virtualized communication function or application is obtained from the database.

10. The apparatus according to claim 4, wherein
the apparatus is comprised in one of a communication element comprising a terminal device or user equipment capable of communicating in virtual network operation in the communication network, a network element or network function of a radio access network part of the communication network, a network element or network function of a fixed access network part of the communication network, a network element or network function of a core network part of the communication network, a network element or network function of an IP multimedia system part of the communication network, and a communication function or application communicating in the communication network,
wherein the at least one new virtualized communication function or application being instantiated is related to a communication network control function of the communication network in virtual network operation.

11. A non-transitory computer-readable medium storing instructions that, when executed by a processing device, perform at least one of a first method and a second method, wherein the first method comprises:
determining in virtual network operation that at least one virtualized communication function or application providing services related to a communication network is instantiated,
preparing an indication related to the instantiation of the at least one virtualized communication function or application in virtual network operation, and
causing transmission of the prepared indication in virtual network operation to at least one of a network element of the communication network, a network function of the communication network, a communication function, an application and a database to which network elements, network functions, communication functions or applications in the communication network have access, wherein the at least one of a network element of the communication network, the network function of the communication network, the communication function, and the application is a potential signaling partner of the instantiated at least one virtualized communication function or application in virtual network operation in a communication conducted via the communication network;
wherein the second method comprises:
obtaining in virtual network operation an indication related to an instantiation of at least one new virtualized communication function or application providing services related to a communication network, wherein the instantiated at least one new virtualized communication function or application is a potential signaling partner in virtual network operation in a communication conducted via a communication network,
processing the obtained indication for determining or recognizing the at least one new virtualized communication function or application being instantiated in virtual network operation,
checking, with regard to a communication to be conducted in virtual network operation in the communication network with a network element or network function, a communication function or application in a communication network, whether the at least one new virtualized communication function or application is providing suitable services related to the communication, and
selecting, on the basis of the result of the check, a network element or network function, communication function or application in virtual network operation in the communication network with which a communication is to be conducted.

12. A method executed by one of a communication element comprising a terminal device or user equipment capable of communicating in virtual network operation in a communication network, a network element or network function of a radio access network part of a communication network, a network element or network function of a fixed access network part of a communication network, a network element or network function of a core network part of a communication network, a network element or network function of an IP multimedia system part of a communication network, and a communication function or application communicating in a communication network, and comprising obtaining in virtual network operation an indication related to an instantiation of at least one new virtualized communication function or application providing services related to a communication network, wherein the instantiated at least one new virtualized communication function or application is a potential signaling partner in virtual network operation in a communication conducted via a communication network, processing the obtained indication for determining or recognizing the at least one new virtualized communication function or application being instantiated in virtual network operation, checking, with regard to, in virtual network operation, a communication to be conducted in the communication network with a network element or network function, a communication function or application in a communication network, whether the at least one new virtualized communication function or application is providing suitable services related to the communication, selecting, on the basis of the result of the check, the at least one new virtualized communication function or application as a network element or network function, communication function or application in the communication network with which, in virtual network operation, a communication is to be conducted, and causing in virtual network operation initialization of the communication involving the at least one new virtualized communication function or application.

* * * * *